US005163245A

United States Patent [19]
Russell

[11] Patent Number: 5,163,245
[45] Date of Patent: Nov. 17, 1992

[54] FISH HOOK CONSTRUCTION

[76] Inventor: Frank W. Russell, 6515 Glidden La., San Diego, Calif. 92111

[21] Appl. No.: 790,907

[22] Filed: Nov. 13, 1991

[51] Int. Cl.⁵ .................. A01K 83/00; B21F 45/12
[52] U.S. Cl. ........................................ 43/43.16; 29/9
[58] Field of Search ............... 43/43.16, 5; 29/9; 140/58, 67; 411/456; D22/144

[56] References Cited

U.S. PATENT DOCUMENTS

| | | | |
|---|---|---|---|
| 2,118,147 | 5/1938 | Blodgett et al. | 43/6 |
| 2,526,240 | 10/1950 | Labunde | 43/43.16 |
| 2,599,626 | 6/1952 | Gottschalk et al. | 43/43.16 |
| 2,823,485 | 2/1958 | Traumuller | 43/43.16 |
| 2,906,054 | 9/1959 | Morehead | 43/43.16 |
| 3,505,756 | 4/1970 | Bowden | 43/43.16 |
| 3,624,690 | 11/1971 | Ashley | 43/43.16 |
| 4,543,742 | 10/1985 | Rand, Jr. | 43/43.16 |
| 4,757,634 | 7/1988 | Meixsell, Jr. | 43/43.16 |

FOREIGN PATENT DOCUMENTS

| | | | |
|---|---|---|---|
| 1810800 | 4/1970 | Fed. Rep. of Germany | 140/58 |
| 491358 | 12/1976 | U.S.S.R. | 43/43.16 |
| 1344302 | 10/1987 | U.S.S.R. | 43/43.16 |

Primary Examiner—Richard K. Seidel
Assistant Examiner—Jeanne M. Elpel
Attorney, Agent, or Firm—Henderson & Sturm

[57] ABSTRACT

An improvement to conventional fish hook units (11) comprising a J-shaped shank member (20) having a sharpened point (22) formed on one end; wherein the improvement comprises a discrete auxiliary barb member (30) having one portion (31) captively engaged with the interior of the shank member (20) by crimping.

5 Claims, 1 Drawing Sheet

FISH HOOK CONSTRUCTION

TECHNICAL FIELD

The present invention relates to fish hook construction in general, and in particular to a fish hook construction provided with one or more discrete barbs.

BACKGROUND ART

This invention was the subject matter of Document Disclosure Program Registration No. 272,003 which was filed in the United States Patent and Trademark Office on Jan. 22, 1991.

As can be seen by reference to the following U.S. Pat. Nos. 2,823,485; 3,505,756; 3,624,690; and 4,757,634; the prior art is replete with myriad and diverse fish hook constructions equipped with both single and multiple barbs.

While all of the aforementioned prior art constructions are more than adequate for the basic purpose and function for which they have been specifically designed, these prior art constructions are limited in the respect that they cannot catch and hold fish of diverse sizes. The barbs that are provided in U.S. Pat. Nos. 2,823,485 and 3,505,756 are relatively large in comparison to the conventional barb, resulting in difficulty in catching fish of smaller sizes. In U.S. Pat. Nos. 3,624,690 and 4,757,634, barbs having reduced dimensions relative to conventional barbs are disclosed, but the design of these barbs is such that they can easily be dislodged from the mouth of a struggling fish, especially a large fish.

As a consequence of the foregoing situation, there has existed a longstanding need for a fish hook construction equipped with one or more barbs that have reduced dimensions relative to a conventional barb; but, are strong enough to hold a large fish firmly without becoming dislodged; and, the provision of such a construction is a stated objective of the present invention.

DISCLOSURE OF THE INVENTION

Briefly stated, the fish hook construction that forms the basis of the present invention comprises a rather straight forward modification to a conventional fish hook; wherein, the conventional fish hook may be of either the barbless or barbed variety.

In essence the conventional fish hook construction is modified by the permanent installation of one or more needle thin auxiliary barbs to selected portions of the periphery of the shank of the fish hook proximate the point of the fish hook.

As will be explained in greater detail further on in the specification, the auxiliary barb member has a very small diameter relative to the thickness of the hook shank and/or the width of the standard barb on a conventional barbed hook.

In addition the reduced diameter of the auxiliary barb member gives resiliency to the auxiliary barb member; such that the auxiliary barb member is capable of being depressed against the hook shank as the point penetrates the flesh of a fish; so that once the auxiliary barb member has passed through the fishes flesh the free end of the auxiliary barb member will spring outwardly to prevent the fish hook from being disengaged from the fish.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figures 1, 2, 3:
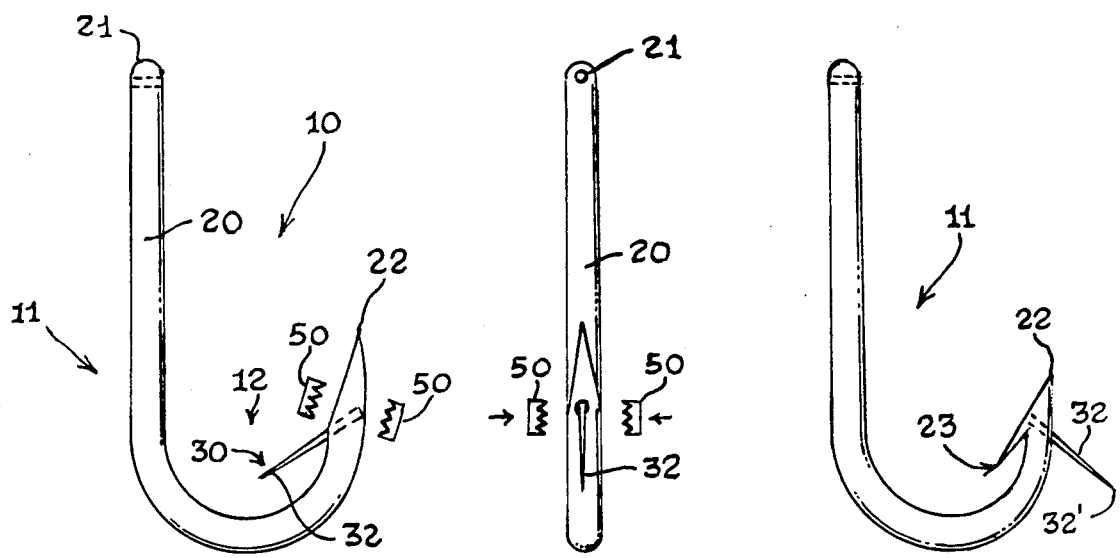
FIG. 1 is a side plan view of one version of the preferred embodiment.
FIG. 2 is a front plan view of a second version of the preferred embodiment.
FIG. 3 is a side plan view of the second version.

As can be seen by reference to the drawings, and in particular to FIG. 1, the fish hook construction that forms the basis of the present invention is designated generally by the reference numeral (10). The fish hook construction (10) comprises in general a conventional fish hook body unit (11) which is provided with at least one auxiliary barb unit (12). These units will now be described in seriatim fashion.

Figure 7:
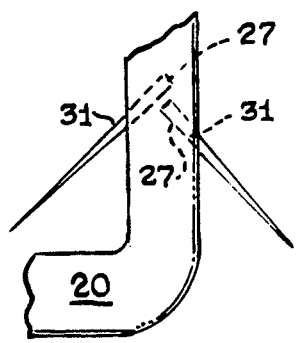
FIG. 7 is an enlarged cross-sectional view of yet another alternate version of the preferred embodiment.

In the barbless version of the preferred embodiment illustrated in FIGS. 1 and 7 the conventional fish hook body unit (11) comprises a generally J-shaped shank member (20) having an eyelet (21) formed on the upper end and a sharpened point (22) formed on the lower end.

Figures 4, 5, 6:
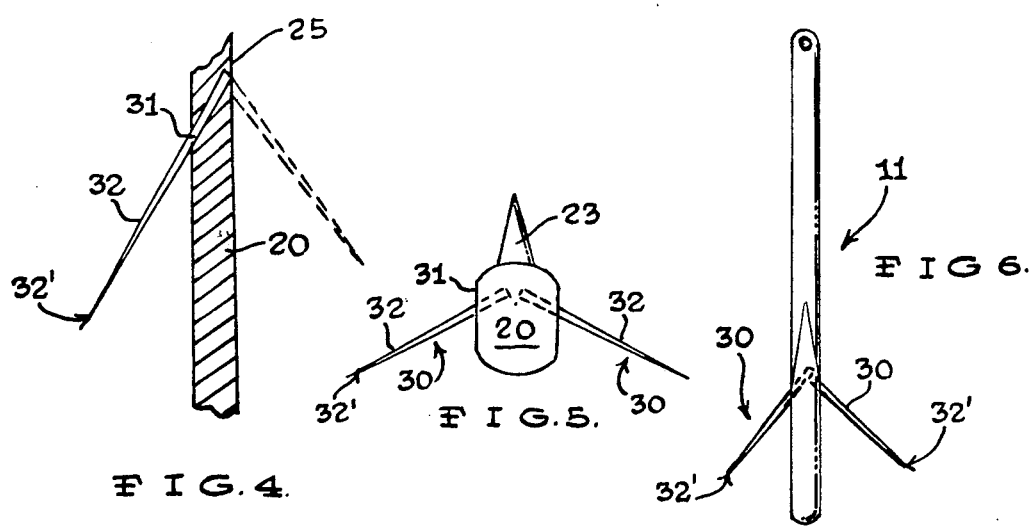
FIG. 4 is an isolated cross-sectional view of a typical attachment of the discrete barb of this invention to the shank portion of a conventional hook.
FIG. 5 is an enlarged cross-sectional detail view of an alternate version of the preferred embodiment.
FIG. 6 is a front plan view of the alternate version.

In the "barbed" versions of the preferred embodiment depicted in FIGS. 3 and 5 the conventional fish hook body unit (11) comprises a generally J-shaped shank member (20) having an inwardly directed barb (23) formed integrally with the shank point (22).

In all of the versions of the preferred embodiment depicted in the drawings the auxiliary barb unit (12) comprises a very discrete tapered barb member (30) having a relatively uniform diameter upper portion (31) formed integrally with relatively long tapering lower portion (32) which terminates in a needle point (32').

As can best be seen by reference to FIG. 4, the diameter of the auxiliary barb member (30) represents only a small fraction of the thickness of the hook shank (20); and, it is further intended that the auxiliary barb member (30) be fabricated from a very thin yet rigid metal wire (40) such as would be produced from music wire (high carbon spring steel), stainless steel or the like.

As can also best be seen by reference to FIG. 4, the auxiliary barb member (30) is attached to the shank (20) via a permanent bond (33) being formed between the upper leg (31) of the auxiliary barb member (30) and the periphery of the shank (2). Furthermore this permanent bond (33) may be formed in a number of conventional ways, such as by a hole made in the shank on a 45-degree angle or a 90-degree angle and then crimped such as by the jaws (50) of a crimping tool to secure the flexible barb as shown in FIGS. 1 and 2; or by welding, brazing, space age adhesives, or the like.

As can be appreciated by reference to FIGS. 4 and 7, the engagement of one or more of the auxiliary barb members (30) to the shank member (20) is accomplished in a unique manner that take advantage of the generally malleable nature of steel wire in the annealed condition.

As shown in FIG. 4, when a single auxiliary barb member (30) is to be employed, a very discrete angled aperture (25) is formed in and extends completely through the shank member (20); wherein, the angled aperture (25) is dimensioned to allow the barb member (30) to be inserted through either end of the aperture (25) to position the large end (31) of the barb member (30) within the shank member (20) prior to the shank member (20) being crimped to captively frictionally engage the large end (31) of the barb member (30) inside the shank. In addition the flexible barb may also be made to have both ends identically needle pointed. This alternative may prove to be desirable in facilitating easier assembly and manufacturing.

In the alternate version depicted in FIG. 7, the shank member (20) is provided with one or more discrete angled bores (27) which are dimensioned to receive at least a portion of the large end (31) of the auxiliary barb members (30), which are likewise brought into captive engagement with the interior of the shank member (20) by crimping, prior to the heat treating step which hardens both the auxiliary barb member (30) as well as the shank member (20).

In the embodiment of FIG. 1 the auxiliary barb member (30) projects outwardly from the interior curvature of the shank member (20) proximate the point (22) of the fish hook unit (11). However in the versions depicted in FIGS. 2 and 3, the auxiliary barb member (30) projects outwardly from the exterior curvature of the shank (20) proximate the point (22) and on the opposite side of the inwardly directed barb (23).

In yet other versions of the preferred embodiment depicted in FIGS. 5 or 6, a plurality of auxiliary barbs (30) (30) are employed in an outwardly flanking relationship relative to the shank member (20); wherein, the barbs (30) (30) are equally spaced from the hook barb (23).

In an alternate version of the preferred embodiment depicted in FIG. 7, it can be seen that this invention also comtemplates the deployment of plural staggered auxiliary barbs (30) (30) depicted in solid lines.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

What is claimed is:

1. In a fish hook construction; comprising a J-shaped shank member having a sharpened point formed on one end; and further provided with at least one discrete bored aperture in the shank member; an improvement comprising:
    at least on auxiliary barb unit captively engaged in the interior of the said at least one bored aperture in the shank member proximate said point; wherein said at least one auxiliary barb unit comprises: a barb member having a relatively short uniform diameter upper portion formed integrally with a generally elongated and tapered lower portion which terminates in a needle point; and, wherein the captive engagement of the barb unit relative to the said at least one bored aperture in the shank member is accomplished by the forceable collapse of that portion of the shank member which surrounds the relatively uniform diameter upper portion of the said at least one auxiliary barb unit.

2. The improvement as in claim 1; wherein, the uniform diameter portion of said at least one auxiliary barb unit is a small fraction of the thickness of said shank member.

3. The improvement as in claim 1; wherein, said conventional hook construction is further provided with an inwardly directed barb formed integrally with said point.

4. The improvement as in claim 1; wherein, said at least one auxiliary barb unit is fabricated from a thin generally rigid yet flexible metal wire.

5. A method for fabrication a fish hook with an auxiliary barb by the steps of
    a) forming an angled aperture in the pointed end of the fish hook prior to the fish hook being heat treated;
    b) inserting an auxiliary barb member having a uniform diameter upper portion and a tapering lower portion into the angled aperture in the shank member, such that the uniform diameter upper portion is disposed within the shank member; and,
    c) crimping the shank member in the vicinity of the aperture to captively engage the upper portion of the barb member relative to the interior of the shank member.

* * * * *